(12) United States Patent
Duan et al.

(10) Patent No.: US 10,985,572 B2
(45) Date of Patent: Apr. 20, 2021

(54) OPTIMAL CHARGING AND DISCHARGING CONTROL FOR HYBRID ENERGY STORAGE SYSTEM BASED ON REINFORCEMENT LEARNING

(71) Applicants: Jiajun Duan, San Jose, CA (US); Zhehan Yi, San Jose, CA (US); Xiao Lu, Nanjing (CN); Di Shi, San Jose, CA (US); Zhiwei Wang, San Jose, CA (US)

(72) Inventors: Jiajun Duan, San Jose, CA (US); Zhehan Yi, San Jose, CA (US); Xiao Lu, Nanjing (CN); Di Shi, San Jose, CA (US); Zhiwei Wang, San Jose, CA (US)

(73) Assignee: Geiri Co Ltd, State Grid Jiangxi Electric Power Co, State Grid Corp of China SGCC, GEIRINA, San Jose, CA (US)

( * ) Notice: Subject to any disclaimer, the term of this patent is extended or adjusted under 35 U.S.C. 154(b) by 0 days.

(21) Appl. No.: 16/518,619

(22) Filed: Jul. 22, 2019

(65) Prior Publication Data

US 2020/0106273 A1    Apr. 2, 2020

Related U.S. Application Data

(60) Provisional application No. 62/739,465, filed on Oct. 1, 2018.

(51) Int. Cl.
*H02J 3/38* (2006.01)
*H02J 3/32* (2006.01)
*G06N 3/04* (2006.01)
*G05B 13/04* (2006.01)
*G05B 13/02* (2006.01)

(52) U.S. Cl.
CPC ............ *H02J 3/385* (2013.01); *G05B 13/027* (2013.01); *G05B 13/042* (2013.01); *G06N 3/0454* (2013.01); *H02J 3/32* (2013.01); *H02J 3/388* (2020.01); *H02J 2203/20* (2020.01)

(58) Field of Classification Search
CPC ...... G06N 3/02; G06N 3/0454; G05B 13/028; G05B 2219/23253; G05B 2219/25255; G05B 2219/2642; Y02P 90/02
See application file for complete search history.

(56) References Cited

U.S. PATENT DOCUMENTS 7,839,024 B2 * 11/2010 Cardinal ................. H02J 3/381
                                                      307/84
2019/0140453 A1 * 5/2019 Yi ........................... H02J 3/005

OTHER PUBLICATIONS

A Novel Adaptive Neural Network Constrained Control for a Multi-Area Interconnected Power System With Hybrid Energy Storage, Aug. 2018 (Year: 2018).*
Foruzan, Reinforcement Learning Approach for Optimal Distributed Energy Management in a Microgrid, (Year: 2018)).*

* cited by examiner

*Primary Examiner* — Darrin D Dunn
(74) *Attorney, Agent, or Firm* — Patent Law Office PC; Bao Tran

(57) ABSTRACT

Systems and methods are disclosed to manage a microgrid with a hybrid energy storage system (HESS) includes deriving a dynamic model of a bidirectional-power-converter (BPC)-interfaced HESS; applying a first neural network (NN) to estimate a system dynamic; and applying a second NN to calculate an optimal control input for the HESS through online learning based on the estimated system dynamics.

20 Claims, 14 Drawing Sheets

OPTIMAL CHARGING AND DISCHARGING CONTROL FOR HYBRID ENERGY STORAGE SYSTEM BASED ON REINFORCEMENT LEARNING

TECHNICAL FIELD

This invention is related to systems and methods to reinforcement-learning-based optimal control of the hybrid energy storage system in real time.

BACKGROUND

The development of microgrid technologies featuring renewable distributed energy resources (DERs) have brought new opportunities as well as challenges to conventional distribution systems. Meanwhile, hybrid energy storage system (HESS), e.g., combination of batteries and ultra-capacitors, are deployed to compensate the intermittency of renewable DERs and participate in the real-time demand-supply accommodation, which also helps to defer the extraordinary cost of updating the conventional power grids. This unveils a completely new path to alternate the traditional operation pattern of power systems, which creates significant benefits and convenience for both power suppliers and customers. Currently, HESS consisting of lithium-ion batteries (LIB) and ultra-capacitors (UC) have been widely incorporated in microgrids. However, the discrepancies of energy and power densities result in the disparate dynamic inertias between LIB and UC. Therefore, proper real-time control of HESS with promising transient performance becomes a challenging problem.

In a microgrid with a hierarchical control structure, the state of charge (SOC) of energy storage unit (ESU) can be decided by the centralized tertiary control and realized by distributed secondary/primary control. In the charging process, ESU works as a load bank, while in the discharging process, it performs as a DER. For the rest of time, ESU should be isolated from the system to avoid continuously repeated charging and discharging (C&D) caused by the self-discharging effect. Nevertheless, due to the low inertia of microgrids, the initializing and switching C&D processes for ESU may lead to nuisance disturbances, especially in fast C&D scenarios. The unexpected disturbance significantly degrades the power quality and might damage sensitive loads, such as data centers. It may even trigger false protection schemes under the worst scenarios. This disobeys the original purpose of implementing HESS. Therefore, the desired control policy should provide a smooth C&D solution for HESS in a decentralized manner with plug & play capability.

Conventionally, constant current (CC) and proportion-integration (PI)-based controls are two of the most popular methods in industrial applications. CC control has been widely used in low voltage electronic devices such as cellphone and laptop due to its implementation simplicity. However, the starting and terminating of the CC controller will introduce significant voltage disturbances, which is harmful to microgrids. From this perspective, PI-based control methods can slightly improve the transient performance, since large disturbances are introduced only during the initializing periods of C&D. Even though, PI-based methods generally require excessive parameter tuning efforts and rely on the awareness of system dynamics. Once system parameters deviate from the original set point, e.g., due to aging or heating issues, the performance of PI-based controllers will significantly degrade. Additionally, in practice, the outer voltage loop of double-loop PI controller is usually simplified as a proportional (P) controller to avoid over-C&D, which also limits the performance of PI-based controllers. A common issue is that PI-based algorithms introduce considerable disturbances to the system during C&D processes.

SUMMARY OF THE INVENTION

In one aspect, a reinforcement-learning-based online optimal (RL-OPT) control method realizes the smooth C&D control of HESS. A hybrid AC/DC microgrid involving PV, UC, LIB and DG are considered during the controller design process. Firstly, the dynamic model of modified bidirectional-power-converter (BPC)-interfaced HESS is derived. Considering that the internal impedance of each ESU is unknown, one NN is developed to estimate the system dynamic online. Then, another NN is applied to calculate the optimal control input for the HESS through online learning based on the estimated system dynamics. The control scheme also considers both grid-tied and islanded modes of the microgrids. In grid-tied mode, the main grid is considered as an infinite source which maintains the bus voltage and reactive power at the point of common coupling (PCC) through the voltage source converter (VSC). While in islanded mode, DGs are deployed to maintain the bus voltage at PCC. For either scenario, PV works under the maximum power point tracking (MPPT) mode to maximize the renewable DER utilization.

In another aspect, a method to manage a microgrid with hybrid energy storage system (HESS) includes deriving a dynamic model of a bidirectional-power-converter (BPC)-interfaced HESS; applying a first neural network (NN) to estimate a system dynamic; and applying a second NN to calculate an optimal control input for the HESS through online learning based on the estimated system dynamics.

Advantages of the preferred embodiment may include one or more of the following. The effectiveness of RL-OPT method has been tested through both software simulations and hardware-in-loop (HIL) experiments. The optimal control problem of HESS is formulated using RL method to reduce the disturbances caused by C&D of various energy storage device. The model-free method has the adaptivity for different system dynamics based on the input/output data without the system parameter information. The bidirectional converter topology is designed to avoid redundancy of C&D circuit as well as the self-discharging problem. The RL-OPT controller takes the SOC measurement of the ESU and calculates the optimal control input for the BPC in a decentralized manner. Thus, implementation of the method can be achieved with minimum communication efforts and the plug & play capability of HESS can be easily realized In addition, the RL-OPT does not need current measurement units comparing to the conventional PI-based control methods. Even though, the performance of the control method is significantly improved.

Other features and advantages of the invention will be apparent from the following description of the preferred embodiments thereof, and from the claims.

BRIEF DESCRIPTIONS OF FIGURES

The subject matter that is regarded as the invention may be best understood by reference to the following description taken in conjunction with the accompanying drawing figures in which.

DETAILED DESCRIPTION

Figure 1:
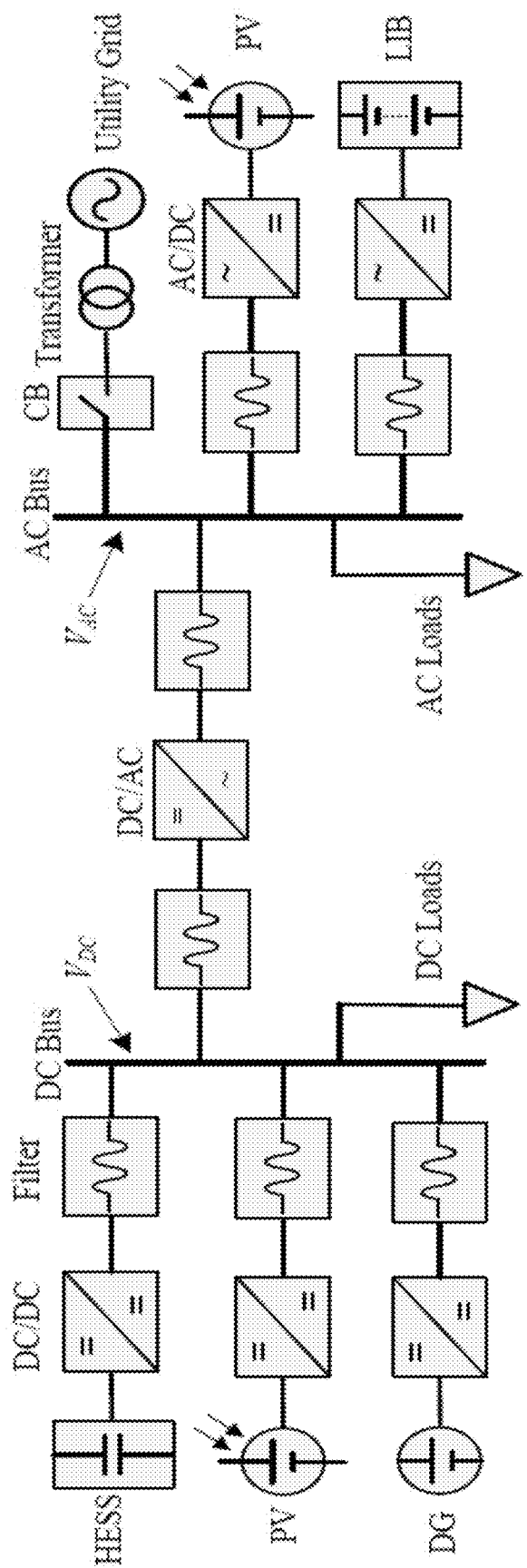
FIG. 1 shows a diagram of the considered hybrid AC/DC microgrid.

As presented in FIG. 1, a reinforcement-learning-based online optimal (RL-OPT) control method is shown for hybrid energy storage system (HESS) in AC/DC microgrids involving photovoltaic (PV) systems and diesel generators (DG). Due to the low system inertia, conventional unregulated charging and discharging (C&D) of energy storages in microgrids may introduce disturbances that degrade the power quality and system performance, especially in fast C&D situations. Secondary and tertiary control levels can optimize the state of charge (SOC) reference of HESS; however, they are lacking the direct controllability of regulating the transient performance. Additionally, the uncertainties in practical systems greatly limit the performance of conventional model-based controllers. In this study, the optimal control theory is applied to optimize the C&D profile and to suppress the disturbances caused by integrating HESS. Neural networks (NN) are devised to estimate the nonlinear dynamics of HESS based on the input/output measurements, and to learn the optimal control input for bidirectional-converter-interfaced HESS using the estimated system dynamics. Because the RL-OPT method is fully decentralized, which only requires the local measurements, the plug & play capability of HESS can be easily realized. Both islanded and grid-tied modes are considered.

The studied microgrid consists of both AC and DC buses, which are interconnected through a bidirectional DC/AC voltage source converter (VSC). The PV array (in MPPT mode) and a HESS involving both UC and LIB are connected on the DC bus. Grid-tied and islanded operation mode switching of the microgrid is realized by operating the circuit breaker (CB).

Figure 2:
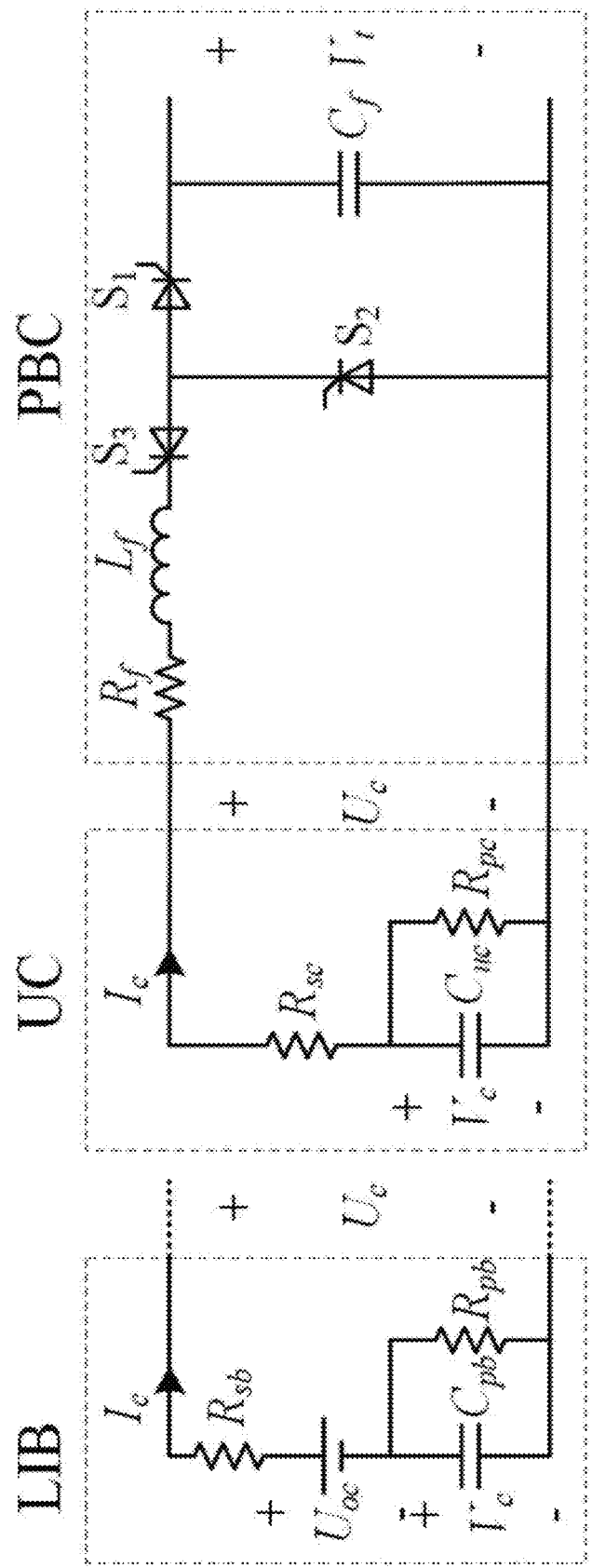
FIG. 2 shows a switch-level UC interface circuit.

The corresponding switch-level C&D circuit with detailed ESU model is presented in FIG. 2. In the modified BPC, switch $S_3$ is added to avoid the self-discharging problem during the initiating period of system. Switches $S_1$ and $S_2$ are used to control the BPC in buck or boost mode to charge or discharge the ESU in HESS, respectively.

Basically, the dynamics of a standard BPC-interfaced-UC model can be represented as $$\begin{cases} \dot{V}_c = -\dfrac{V_c}{C_{uc}R_{pc}} + \dfrac{I_c}{C_{uc}} \\ U_c = V_c + R_{sc}I_c \\ \dot{I}_c = \dfrac{1}{L_f}(U_c - R_f I_c - \alpha V_t) \end{cases} \quad (1)$$

in which $$\alpha = \begin{cases} \dfrac{1}{1-D}, & \forall S_1 \text{ is off} \\ \dfrac{1}{D}, & \forall S_2 \text{ is off} \end{cases} \quad (2)$$

and D is the duty ratio of PWM. $R_f$, $L_f$ and $C_f$ are filter resistance, inductance and capacitance, respectively. $R_{pc}$ and $R_{sc}$ are the internal parallel and series resistance of UC, respectively. Similarly, $R_{pb}$ and $R_{sb}$ are the internal parallel and series resistance of LIB, respectively. $V_c$ and $U_c$ are the internal and external voltages of ESU, respectively. $V_t$ is the terminal bus voltage. Then, the dynamics in Eqn. (1) can be further written as $$\dot{U}_c = \left(\dfrac{R_{sc}}{L_f} - \dfrac{1}{C_{uc}R_{pc}}\right)U_c - \dfrac{R_{sc}V_t}{L_f}\alpha + \left(\dfrac{R_{pc}+R_{sc}}{C_{uc}R_p} - \dfrac{R_{sc}R_f}{L_f}\right)I_c \quad (3)$$

By defining the tracking error as $e(t)=U_e(t)-U_c^*$ with $U_c^*$ being a constant SOC reference, the error dynamics of (3) can be represented in a more condensed way as $$\dot{e}(t)=f(e(t))+g(t)u(t)+D(t), e(0)=e_0 \quad (4)$$

where $\dot{e}(t)=\dot{U}_c(t)-\dot{U}_c^*=\dot{U}_c(t)-0=\dot{U}_c(t)$; $f(e)=(R_{sc}/L_f-1/C_{uc}R_{pc})U_c$ and $g(t)=R_{sc}V_t/L_f$ are unknown nonlinear system dynamics. $u(t)=\alpha$ is the control input. $D(t)=[(R_{pc}+R_{sc})/C_{uc}R_p-R_{sc}R_f/L_f]I_c$ is the perturbation term of the system with $D(0)=0$ and is bounded as $\|D(t)\|\le d_{max}$. It should be noted that the error dynamics of LIB can be similarly represented in a form as Eqn. (4) and the derivative process is omitted here.

The performance of conventional PI-based control methods on a nonlinear uncertain system in Eqn. (4) would be very limited, especially when system dynamics are unknown. The trial & error tuning is also impractical and not reliable enough to guarantee the system performance.

Firstly, considering a nominal nonlinear system without uncertainty D, i.e., $\dot{e}(t)=f(e(t))+g(t)u(t)$, the infinite-horizon integral cost function can be designed as $$\dot{e}(t)=f(e(t))+g(t)u(t)+D(t), e(0)=e_0 \quad (5)$$

where $r(e,u)=Q(e)+u^T R u$ with R being a symmetric positive definite matrix and $Q(e)=e^T P e$ being a positive definite function of e.

There exists a control law $u(e)$ that guarantees the asymptotic stability of the closed-loop nonlinear system in Eqn. (4) when the preconditions in Eqn. (5) can be satisfied with respect to a positive definite continuously differentiable function $V(e)$, a bounded function $\Gamma(e)$, and a feedback control law $u(e)$.

$$\begin{cases} V_{\partial e}^T D(t) \le \Gamma(e) \\ V_{\partial e}^T [f(e)+g(t)u]+\Gamma(e)+Q(e)+u^T R u = 0 \end{cases} \quad (6)$$

where $V_{\partial e}$ is the partial derivative of the cost function V(e) with respect to e. Then, cost function Eqn. (4) satisfies $$\sup_{D(t)\in M} J(e_0, u) \leq J_d(e_0, u) = V(e_0) \qquad (7)$$

where "sup" denotes the supremum operator that finds the minimal cost $J_d(e_0,u)$ greater than or equal to $J(e_0,u)$ for any perturbation $D(t) \in M, M = \{D(t)|D(t)\in \Re, \|D(t)\|\leq d_{max}\}$. $J_d(e_0, u)$ is the modified cost function for nonlinear system with uncertainty, which can be designed as $$J_d(e_0,u)=\int_0^\infty [r(e,u)+\Gamma(e)]dt \qquad (8)$$

Then, the Eqn. (8) can be further written as $$J_d(e_0,u)=V(e_0)=\int_0^T[r(e,u)+\Gamma(e)]dt+\int_T^\infty[r(e,u)+\Gamma(e)]dt=\int_0^T[r(e,u)+\Gamma(e)]dt+V(e) \qquad (9)$$

Since V(e) is continuously differentiable, Eqn. (9) becomes $$\lim_{T\to 0} \frac{V(e_0)-V(e)}{T} = \qquad (10)$$

$$\lim_{T\to 0}\frac{1}{T}\int_0^T[r(e,u)+\Gamma(e)]dt \Rightarrow \dot{V}(e)=V_{\partial e}^T[f(e)+g(t)u+D]=$$

$$-r(e,u)-\Gamma(e) \Rightarrow 0 = V_{\partial e}^T[f(e)+g(t)u+D]+r(e,u)+\Gamma(e)$$

It can be observed that Eqn. (10) is an infinitesimal version of Eqn. (9). Based on Eqn. (10), Hamiltonian of the optimal control problem can be defined as $$H(e,u,V_{\partial e})=Q(e)+u^T Ru+V_{\partial e}^T[f(e)+g(t)u+D]+\Gamma(e) \qquad (11)$$

Correspondingly, the optimal cost function can be designed as $$V^*(e)=\min_{u\in\Omega}\int_0^T[r(e,u)+\Gamma(e)]dt \qquad (12)$$

The objective of optimal cost function in Eqn. (2) is to achieve the least tracking error using the minimal control effort with unknown disturbances, and therefore, the control process is to design the optimal controller that leads the states to track their references with a minimal tracking error. Then, Eqn. (12) can be obtained by solving the Hamilton-Jacobi-Bellman (HJB) equation as $$\min_{u\in\Omega} H(e,u,V^*_{\partial e})=0 \qquad (13)$$

By taking the partial derivative of HJB equation, i.e., $\partial H(e,u,V_{\partial e}^*)/\partial u=0$, the optimal control law u* can be derived as $$u^*=-\tfrac{1}{2}R^{-1}g(t)^T V_{\partial e}^* \qquad (14)$$

Accordingly, the bounded function can be designed as $$\Gamma(e)=\tfrac{1}{4}V_{\partial e}^T V_{\partial e}+d_{max}^2 \qquad (15)$$

It can be easily proven that $\Gamma(e)$ in Eqn. (15) satisfies the condition in Eqn. (6), i.e., $V_{\partial e}^T D(t) \leq \Gamma(e)$. Substituting Eqn. (14) and (15) into Eqn. (13), the HJB equation in terms of $V_{\partial e}^*$ can be represented as $$0=Q(e)+\tfrac{1}{4}V_{\partial e}^{*T}V_{\partial e}^*+d_{max}^2+V_{\partial e}^{*T}[f(e)+D]-\tfrac{1}{4}V_{\partial e}^{*T}g(t)R^{-1}g(t)^T V_{\partial e}^* \qquad (16)$$

Theorem 1 (Optimal Control Policy u*): Consider any non-linear uncertain systems presented in Eqn. (4) with cost function defined in Eqn. (7) and HJB equation defined in Eqn. (16), provided any admissible control u, the cost function Eqn. (7) is smaller than a guaranteed cost bound $J_b$ given as $$J_b=V^*(e_0)+\int_0^T(u-u^*)^T R(u-u^*)dt \qquad (17)$$

If u=u*, the cost $J_b$ is guaranteed to be minimized, i.e., $J_b=V^*(e_0)$.

Proof: According to Eqn. (10) and the definition of V*(e), the cost function Eqn. (7) with respect to any arbitrary u can be rewritten as $$J(e_0,u)=V^*(e_0)+\int_0^T[r(e,u)+\dot{V}^*(e)]dt \qquad (18)$$

By Eqn. (10) and Eqn. (16), one can obtain that $$r(e,u)+\dot{V}^*(e)=Q(e)+u^T Ru+V_{\partial e}^{*T}[f(e)+g(t)u+D]=u^T Ru+$$
$$V_{\partial e}^{*T}g(t)u+\tfrac{1}{4}V_{\partial e}^{*T}g(t)R^{-1}g(t)^T V_{\partial e}^*-$$
$$\tfrac{1}{4}V_{\partial e}^{*T}V_{\partial e}^*-d_{max}^2 \leq u^T Ru+V_{\partial e}^{*T}g(t)u+\tfrac{1}{4}V_{\partial e}^{*T}g$$
$$(t)R^{-1}g(t)^T V_{\partial e}^* \qquad (19)$$

Recalling Eqn. (14), Eqn. (19) can be compiled into a square form with respect to $R^{-1}g(t)^T V_{\partial e}^*/2$ as $$r(e,u)+\dot{V}^*(e)\leq (u-u^*)^T R(u-u^*) \qquad (20)$$

which implies that Eqn. (14) holds. Thus, if u=u*, the cost $J_b$ is guaranteed to be minimized, i.e., $J_b=V^*(e_0)$, and the corresponding optimal control input is u*. Proof completed. ♦

The above optimal control is derived based on known nonlinear system dynamics. However, it is very difficult to numerically solve the optimal control problem of a nonlinear system, especially when system dynamics is unknown.

Generally, the optimal control input u* is calculated based on the solution of HJB (Eqn. (16)). However, in practice, the system uncertainty makes the nonlinear partial derivative function too complicated to be solved directly. Therefore, two NNs are developed in this section to realize the adaptive online learning of optimal control policy. Firstly, an NN is designed to estimate the unknown system dynamics, based on which another NN is developed to solve the optimal policy. The detailed control implementation process of the controller is elaborated below.

A. System Dynamic Identifier Design

According to the universal approximation capability of NN, the system dynamics in Eqn. (4) can be represented by a single-layer NN as $$\dot{e}(t)=f(e(t))+g(t)u(t)+D(t)=W_e^{*T}\sigma_1(e)+W_u^{*T}\sigma_1(u)+$$
$$W_d^{*T}1+\epsilon_1=W_1^{*T}\sigma_1(e,u)+\epsilon_1 \qquad (21)$$

where $W_1^*=[W_e^* \ W_u^* \ W_d^*]^T \in \Re^{N\times 1}$ are ideal unknown weights of NN identifier approximating system dynamics f(e), g(t) and D. $\sigma_1(e,u)=[\sigma_1(e) \ \sigma_1(u) \ 1]\in\Re^{N\times 1}$ is the activation function where 1 represents the vector of ones. N is the number of hidden-layer neurons. $\epsilon_1$ is the NN reconstruction error. $W_1^*$ and $\epsilon_1$ are assumed to be bounded as $\|W_1^*\|\leq W_{1M}$ and $\|\epsilon_1\|\leq \epsilon_{1M}$, respectively. It should be mentioned that since D is a perturbation term associated with the system dynamics rather than a random external disturbance, term D satisfies the conditions to be estimated by NN. Then, the tracking error dynamics estimator can be designed as $$\hat{\dot{e}}(t)=\hat{W}_1^T\sigma_1(e,u)+k_1\tilde{e}(t) \qquad (22)$$

where $\hat{W}_1=[\hat{W}_e \ \hat{W}_u \ \hat{W}_d]^T \in\Re^{N\times 1}$ are the estimated NN identifier weights and $k_1$ is the selected parameter to maintain the NN identifier stability. Defining $\tilde{e}(t)=e(t)-\hat{e}(t)$ as the estimation error of tracking error, the dynamics of $\tilde{e}(t)$ can be represented as $$\dot{\tilde{e}}(t)=\dot{e}(t)-$$
$$\hat{\dot{e}}(t)=W_1^{*T}\sigma_1(e,u)+\epsilon_1-\hat{W}_1^T\sigma_1(e,u)-k_1\tilde{e}(t)=\tilde{W}_1^T\sigma_1(e,u)+\epsilon_1-k_1\tilde{e}(t) \qquad (23)$$

where the NN weight estimation error is defined as $\tilde{W}_1(t)=W_1^*-\hat{W}_1(t)$, and furthermore, $\dot{\tilde{W}}_1(t)=-\dot{\hat{W}}_1(t)$. To force the estimated NN identifier weight $\hat{W}_1(t)$ converging to the target weight $W_1^*$, the updating law for $\hat{W}_1$ can be designed as $$\dot{\hat{W}}_1=-k_2\hat{W}_1^T\sigma_1(e,u)+\sigma_1(e,u)e(t) \quad (24)$$

where $k_2$ is a positive tuning parameter of NN identifier.

Theorem 2 Boundedness of NN identifier): Using the NN identifier in Eqn. (22) with updating law in Eqn. (24) and letting the activation function $\sigma_1(e,u)$ satisfy the persistency of excitation (PE) condition. Given the initial NN identifier weight as $\hat{W}_1(0)$ residing in a compact set $\Omega$, there exists a positive tuning parameter $k_2$ such that the identification error $\tilde{e}(t)$ in Eqn. (23) and NN identifier weight estimation error $\tilde{W}_1(t)$ are uniformly ultimately bounded (UUB).

Proof: Define the following Lyapunov candidate as $$L(\tilde{W},\tilde{e})=\tfrac{1}{2}\tilde{W}_1^2+\tfrac{1}{2}\tilde{e}(t)^2 \quad (25)$$

Then, taking the first derivative of Eqn. (25) and substituting Eqn. (23) and (24), one can obtain that $$\dot{L} = \tilde{W}_1^T \dot{\tilde{W}}_1 + \tilde{e}^T\dot{\tilde{e}} = -\tilde{W}_1^T(-k_2\hat{W}_1+\sigma_1 e)+\tilde{e}^T(\tilde{W}_1^T\sigma_1+\epsilon_1-k_1\tilde{e}) = \quad (26)$$
$$k_2\tilde{W}_1^T(W_1^*-\tilde{W}_1)-k_1\tilde{e}^T\tilde{e}+\tilde{e}^T\epsilon_1 \le \tfrac{1}{2}k_2\tilde{W}_1^T\tilde{W}_1+\tfrac{1}{2}k_2W_1^{*T}W_1^* -$$
$$k_2\tilde{W}_1^T\tilde{W}_1-k_1\tilde{e}^T\tilde{e}+\tilde{e}^T\epsilon_1 \le -\tfrac{1}{2}k_2\|\tilde{W}_1\|^2-k_1\|\tilde{e}\|^2+\epsilon_b$$

where $\epsilon_b=\tilde{e}^T\epsilon_1+\tfrac{1}{2}k_2W_1^{*T}W_1^*$ is a bounded steady-state error. According to the Lyapunov synthesis, one can conclude that the identification error $\tilde{e}(t)$ and NN identifier weight estimation error $\tilde{W}_1(t)$ are UUB.

B. Adaptive RL-OP T Control Design

Similarly, based on the universal approximation property of NN, the cost function $V^*(e)$ can be represented by a single-layer NN on set $\Omega$ as $$V^*(e)=W_2^{*T}\sigma_2(e,u)+\epsilon_2 \quad (27)$$

where $W_2^{*T}\in\mathfrak{R}^{1\times N}$ are ideal unknown weights of NN cost function estimator, $\sigma_2(e,u)$ is the activation function, $\epsilon_2$ is the NN reconstruction error, $W_2^*$ and $\epsilon_2$ are assumed to be bounded as $\|W_2^*\|\le W_{2M}$ and $\|\epsilon_2\|\le\epsilon_{2M}$, respectively. Thereafter, the cost function estimator can be designed as $$\hat{V}(e)=\hat{W}_2^T\sigma_2(e,u) \quad (28)$$

Accordingly, the estimated optimal control policy can be derived based on the two NNs in Eqn. (22) and (28) as $$\hat{u}=-\tfrac{1}{2}R^{-1}\hat{W}_u^T\nabla\sigma_2(e,u)^T\hat{W}_2 \quad (29)$$

where $\nabla\sigma_2(e,u)=\partial\sigma_2(e,u)/\partial e$ is the partial derivative of $\sigma_2(e,u)$ with respect to e. Next, substituting Eqn. (22), (28) and (29) into Eqn. (11), the approximated Hamiltonian of optimal control problem becomes $$\hat{H}(e,\hat{u},\hat{V})=Q(e)+\tfrac{1}{4}\hat{W}_2^T\nabla\sigma_2\hat{W}_uR^{-1}\hat{W}_u^T\nabla\sigma_2^T\hat{W}_2+$$
$$\nabla\sigma_2^T\hat{W}_2[\hat{W}_1^T(t)\sigma_1(e,u)+k_1\tilde{e}(t)]+$$
$$\tfrac{1}{4}\hat{W}_2^T\nabla\sigma_2\nabla\sigma_2^T\hat{W}_2+d_{max}^2 \quad (30)$$

Because of the impact of system uncertainty and NN reconstruction error, the estimated Hamiltonian cannot hold, i.e., $\hat{H}(e,\hat{u},\hat{V})\ne 0$. According to the optimal control theory, the estimated cost function can converge close to the ideal target if the approximated Hamiltonian equation approaches to the ideal Hamiltonian, i.e., $\hat{H}(e,\hat{u},\hat{V})\to H(e,u^*, V^*)=0$. Inspired by this, the updating law for tuning the NN weight of cost function estimator can be designed as $$\dot{\hat{W}}_2 = \tfrac{k_3}{2}\Theta(e,\hat{u})\nabla\sigma_2\hat{W}_uR^{-1}\hat{W}_u^T J_{1\partial e} - \frac{k_4\omega\hat{H}}{(1+\omega^T\omega)^2} \quad (31)$$

where $k_3$ and $k_4$ are the designed control coefficients, $\omega=-[\nabla\sigma_2\hat{W}_uR^{-1}\hat{W}_u^T\nabla\sigma_2^TW_2]/2$, and $\Theta(e,\hat{u})$ is an index operator given by $$\Theta(e,\hat{u})=\begin{cases}0, & \forall \dot{J}_1=J_{1\partial e}^T\dot{e}<0 \\ 1, & \text{otherwise}\end{cases} \quad (32)$$

where $J_1$ is an unbounded Lyapunov candidate and $J_{1\partial e}$ is its partial derivative with respect to e. Moreover, $J_{1\partial e}$ can be defined as $$\|\dot{e}\|\le c_1\|e\|=(c_2\|J_{1\partial e}\|)^{1/4} \quad (33)$$

where $c_1$ and $c_2$ are constants. Note that $\|J_{1\partial e}\|$ can be selected to satisfy the general bound, e.g., $J_1=\tfrac{1}{5}(e^Te)^{5/2}$.

Theorem 3 (Convergence of the Optimal Control): Consider the nonlinear uncertain system in Eqn. (4) with control law in Eqn. (29) and NN weights updating law in Eqn. (24) and (31), there exists tuning parameters $k_1$ to $k_4$ such that all of signals in the closed-loop system, e.g., tracking error e, error of NN identifier weight $\tilde{W}_1$ and error of NN cost function estimator weight $\tilde{W}_2$ are guaranteed to be UUB. Moreover, the calculated control input $\hat{u}$ is proved to approximately approach the optimal control input $\hat{u}^*$.

C. Controller Implementation

Figure 3:
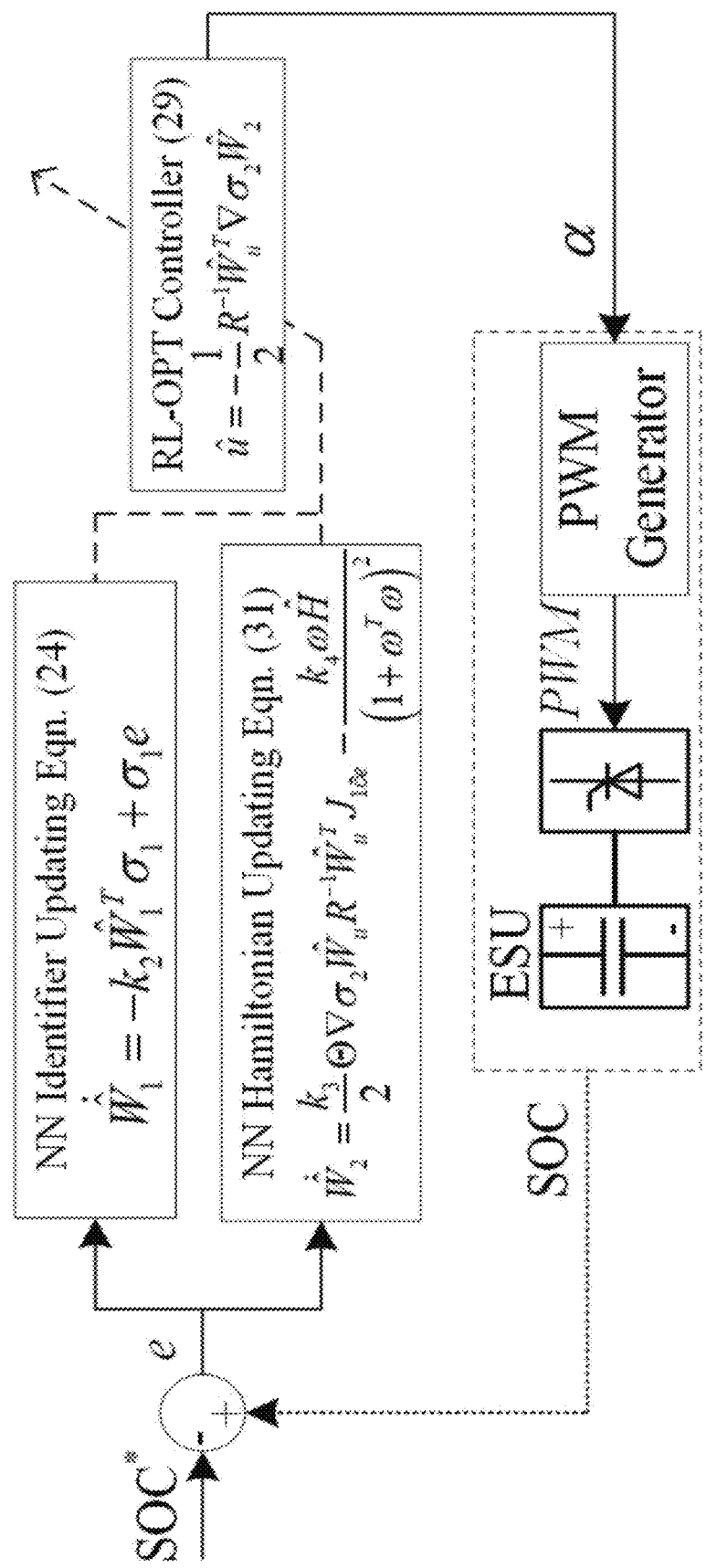
FIG. 3 shows a schematic of the control implementation.

The implementation process of the RL-OPT controller is shown in FIG. 3. In addition, the overall procedures of the control method are summarized in Table I. The RL-OPT controller takes the SOC measurement of the ESU and calculates the optimal control input for the BPC in a decentralized manner. Thus, implementation of the method can be achieved with minimum communication efforts and the plug & play capability of HESS can be easily realized. In addition, the RL-OPT does not need current measurement units comparing to the conventional PI-based control methods. Even though, the performance of the control method is significantly improved, which will be verified in later case studies.

TABLE I

METHODOLOGY OF PROPOSED RL-OPT CONTROLLER

1) Initialize control policy $\hat{u}(0)$ and NN weights $\hat{W}_1(0)$, $\hat{W}_2(0)$
2) while $e > e_1$,
   update $\hat{W}_1$ using Eqn. (24)
3) Calculate the estimate Hamiltonian $\hat{H}(\tilde{e}, \hat{u}, \hat{V})$ using Eqn. (30)
4) while $\hat{H}(\tilde{e}, \hat{u}, \hat{V}) \ne 0$,
   update $\hat{W}_2$ using Eqn. (31)
5) Calculate the optimal control policy $\hat{u}$ using Eqn. (29)
6) end The detailed switch-level model is applied in the simulation using Matlab/Simulink Simscape toolbox with a sampling frequency of 10 kHz. The MOSFET module is used for the bidirectional converter as shown in FIG. 2. The Tustin/Backward Euler method is selected for the discrete solver. Both grid-tied and islanded scenarios are tested under various C&D scenarios. The system and controller parameters are given in Table II.

TABLE II

SYSTEM PARAMETERS OF THE
SIMULATION CASE STUDY

| Parameter | Value | Parameter | Value |
|---|---|---|---|
| $C_{uc}$ | 5.7 F | $R_{pc}$ | 6 kΩ |
| $R_{sc}$ | 0.1 Ω | $C_{pb}$ | 4.7 F |
| $R_{pb}$ | 5 kΩ | $R_{ab}$ | 0.15 Ω |
| $U_{oc}$ | 5 V | $C_f$ | 20 μF |
| $R_f$ | 0.1 Ω | $L_f$ | 4 mH |
| $k_1$ | 2 | $k_2$ | 0.1 |
| $k_3$ | 0.8 | $k_4$ | 1 |

The performance of control method is compared to the conventional PI-based method for benchmarking studies. It should be mentioned that the conventional PI-based control methods usually take a P and PI double-loop structure to avoid the over C&D problem, which requires both voltage and current transducers. From this perspective, the control method only requires one voltage sensor with a much-improved performance, which will be demonstrated in the following case studies.

Figure 4:
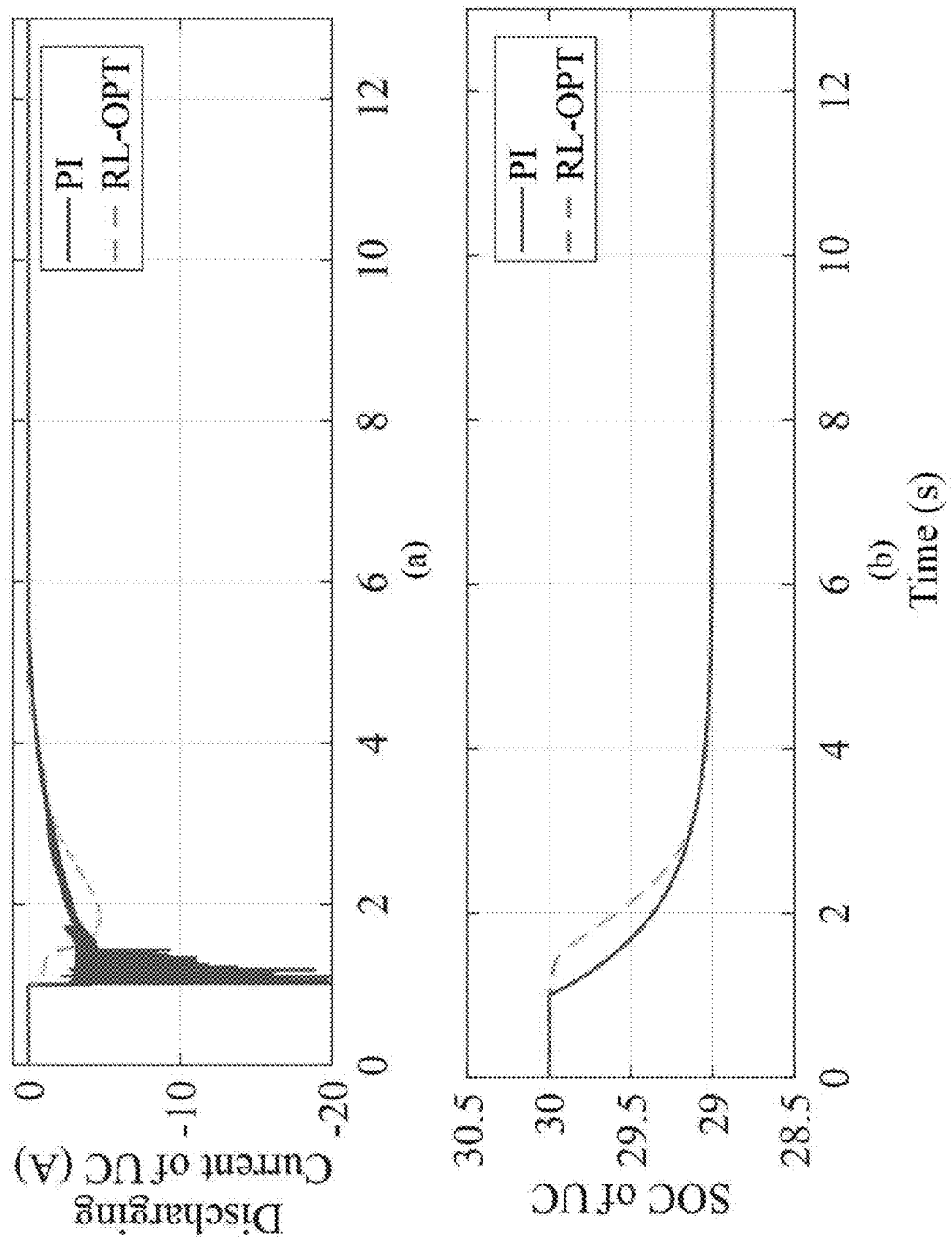
FIG. 4 shows a discharging response of UC in islanded mode.
Figure 5:
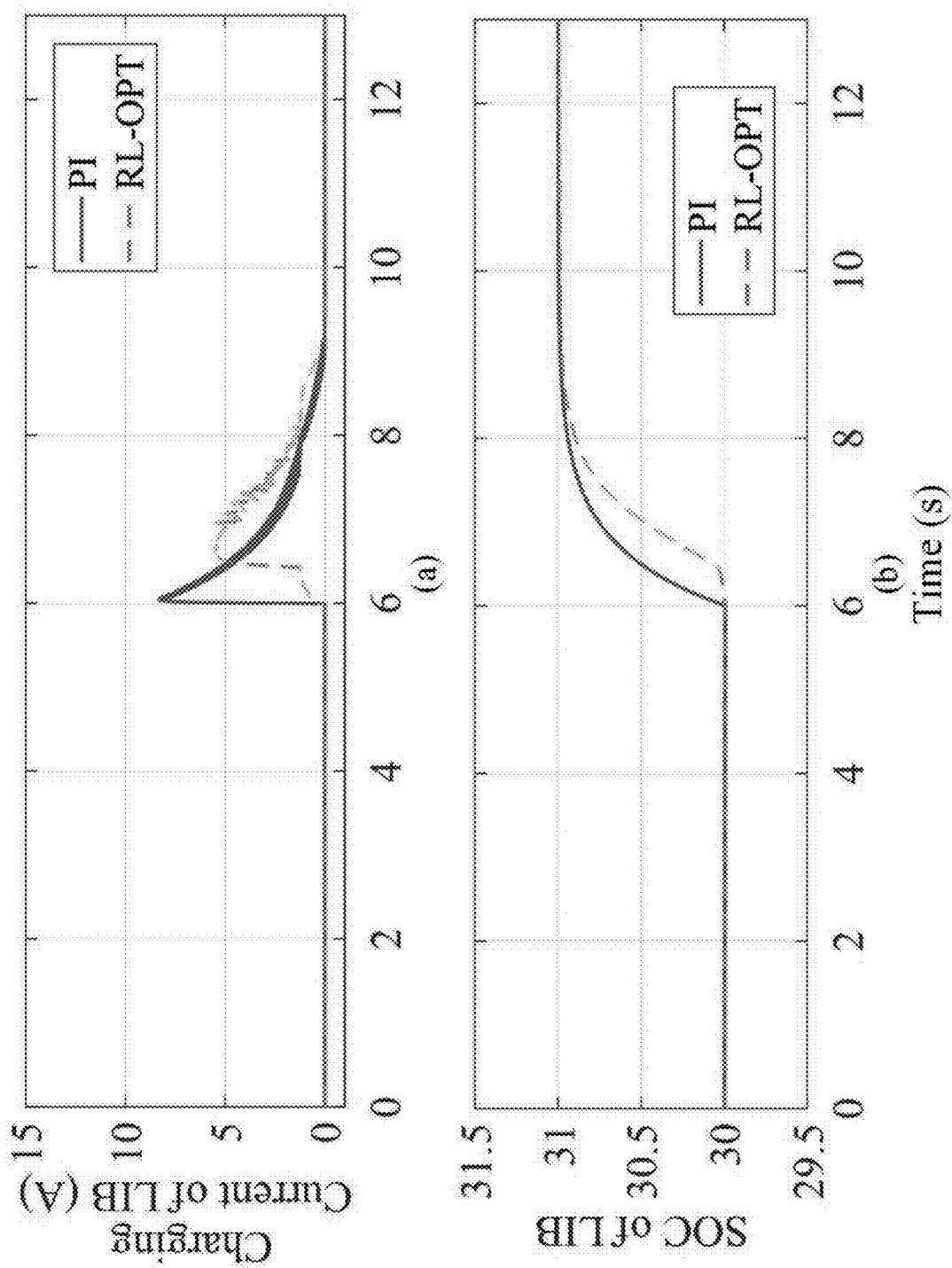
FIG. 5 shows a charging response of LIB in islanded mode.
Figure 6:
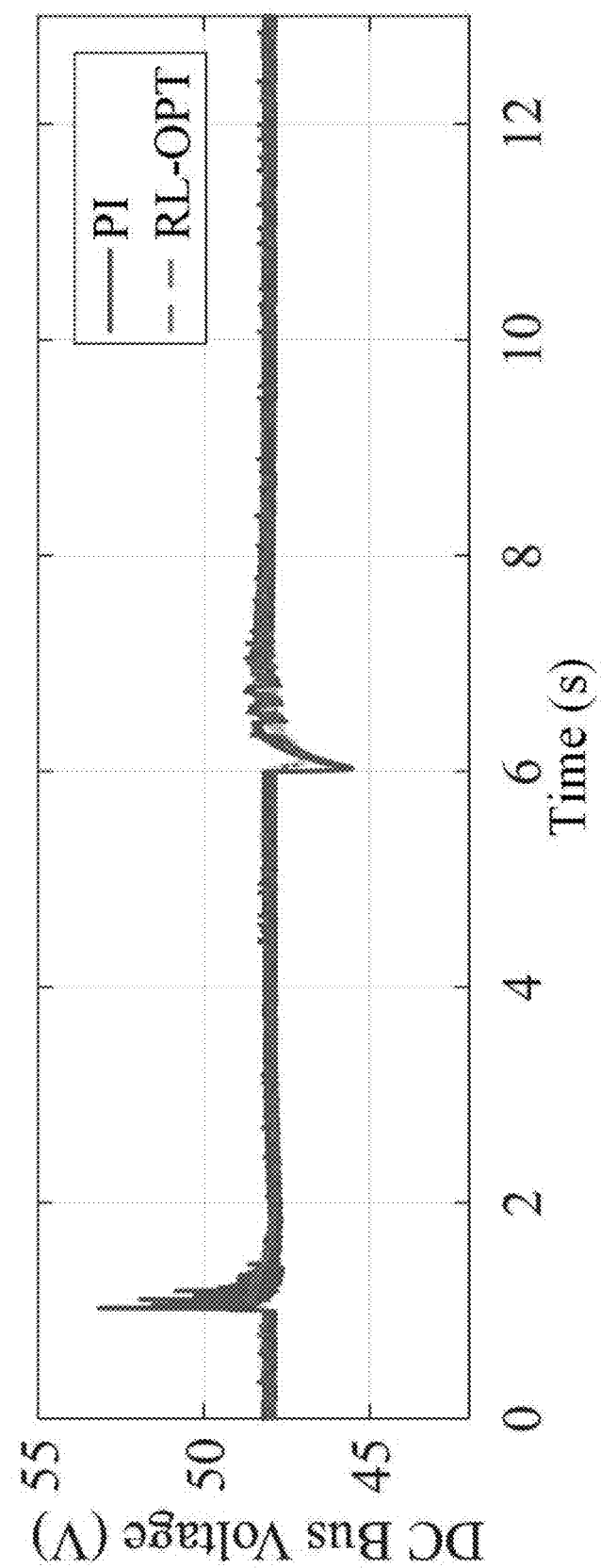
FIG. 6 shows a DC bus voltage response in islanded mode.

In case study I, the RL-OPT control method is tested in an islanded microgrid. One DG is used to regulate the DC bus voltage at 48V constantly. At 1s, the UC is discharged from 300% to 29%. While at time 6s, the LIB is charged from 30% to 31%. Firstly, the discharging current and SOC of UC are shown in FIG. 4. While the charging current and SOC of LIB are plotted in FIG. 5. Additionally, the response of DC bus voltage is presented in FIG. 6.

Figure 7:
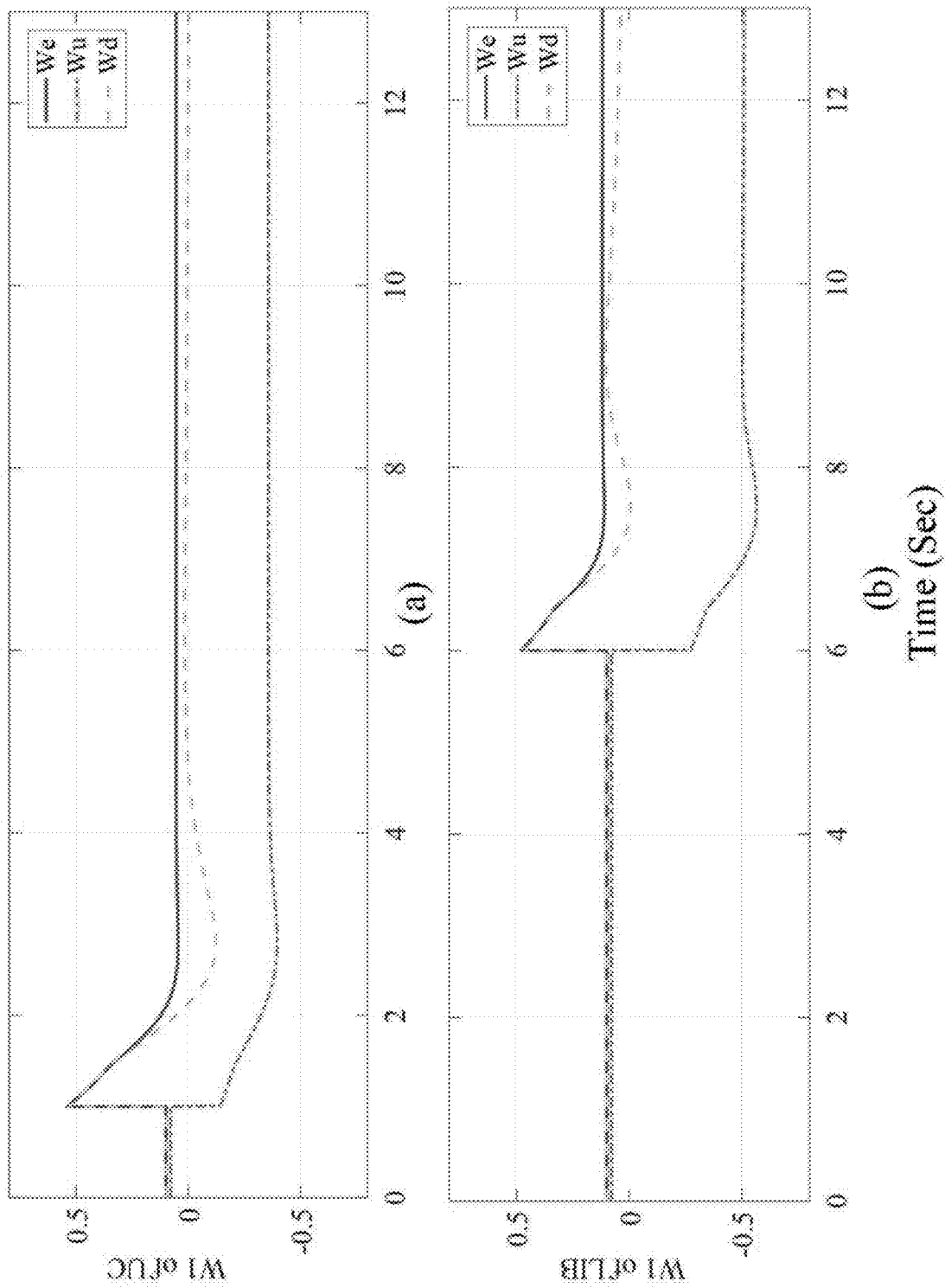
FIG. 7 shows activation weights of NN in islanded mode.

As can be observed, the conventional PI-based control method produces large disturbances to the system (blue curves). The sharply changing C&D current and SOC lead to a huge disruption to the DC bus, e.g., over 5V (>10%) overshoot. The considerable disturbances are harmful to the system, especially for the sensitive loads and power electronic devices. On the contrary, the RL-OPT control method is able to optimize the entire C&D profile (red curves). It can be seen that the C&D currents of ESU get greatly smoothed, which consequently reduces the voltage overshoot of DC bus to be less than 1V (<2%). The responses of activation weights W, is shown in FIG. 7, among which FIG. 7(a) is the weight of UC controller and FIG. 7(b) is the weight of LIB controller, respectively. As the weights converge to their desired target, the optimal control is achieved.

Figure 8:
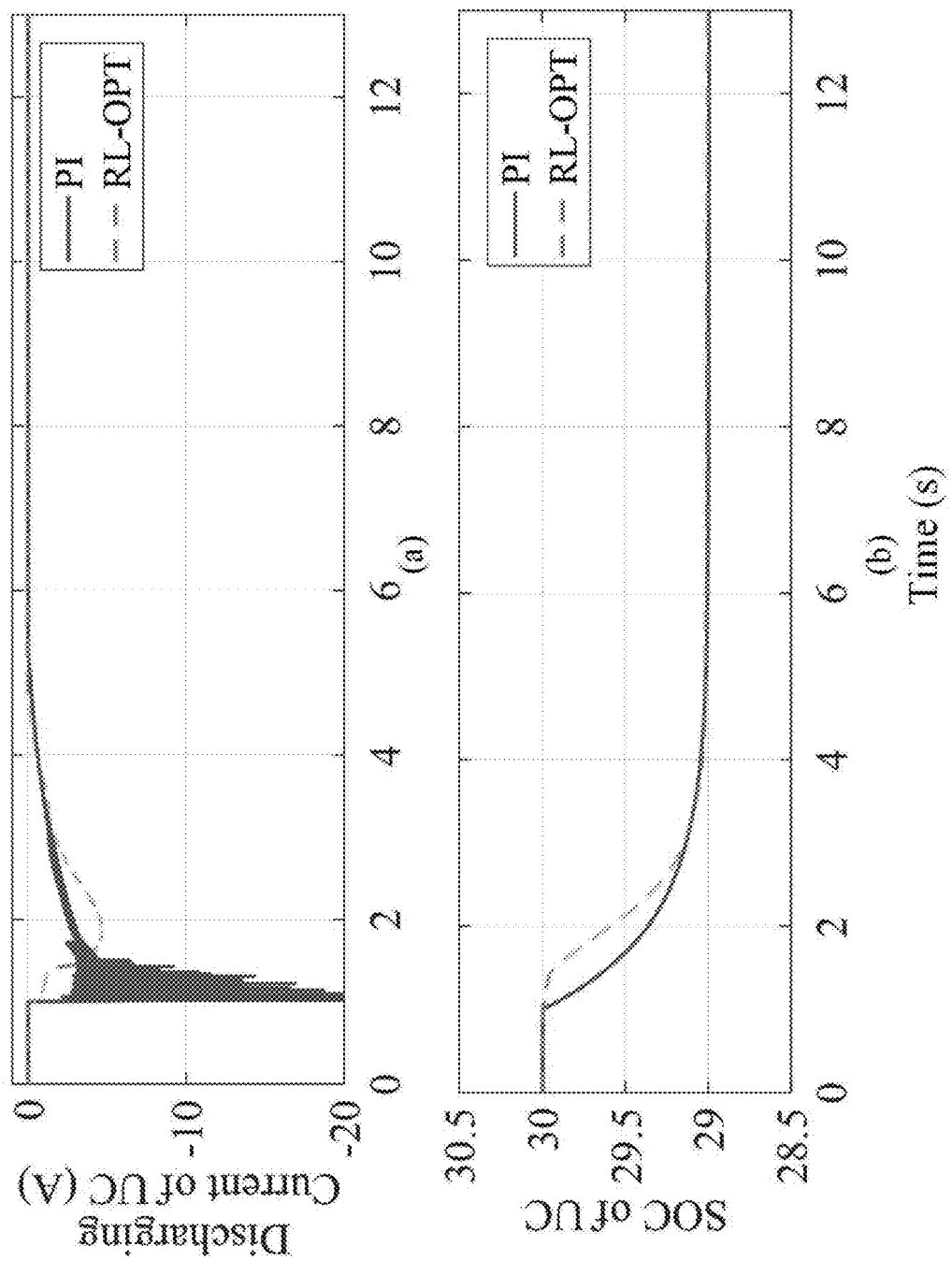
FIG. 8 shows a discharging response of UC in grid-tied mode.
Figure 9:
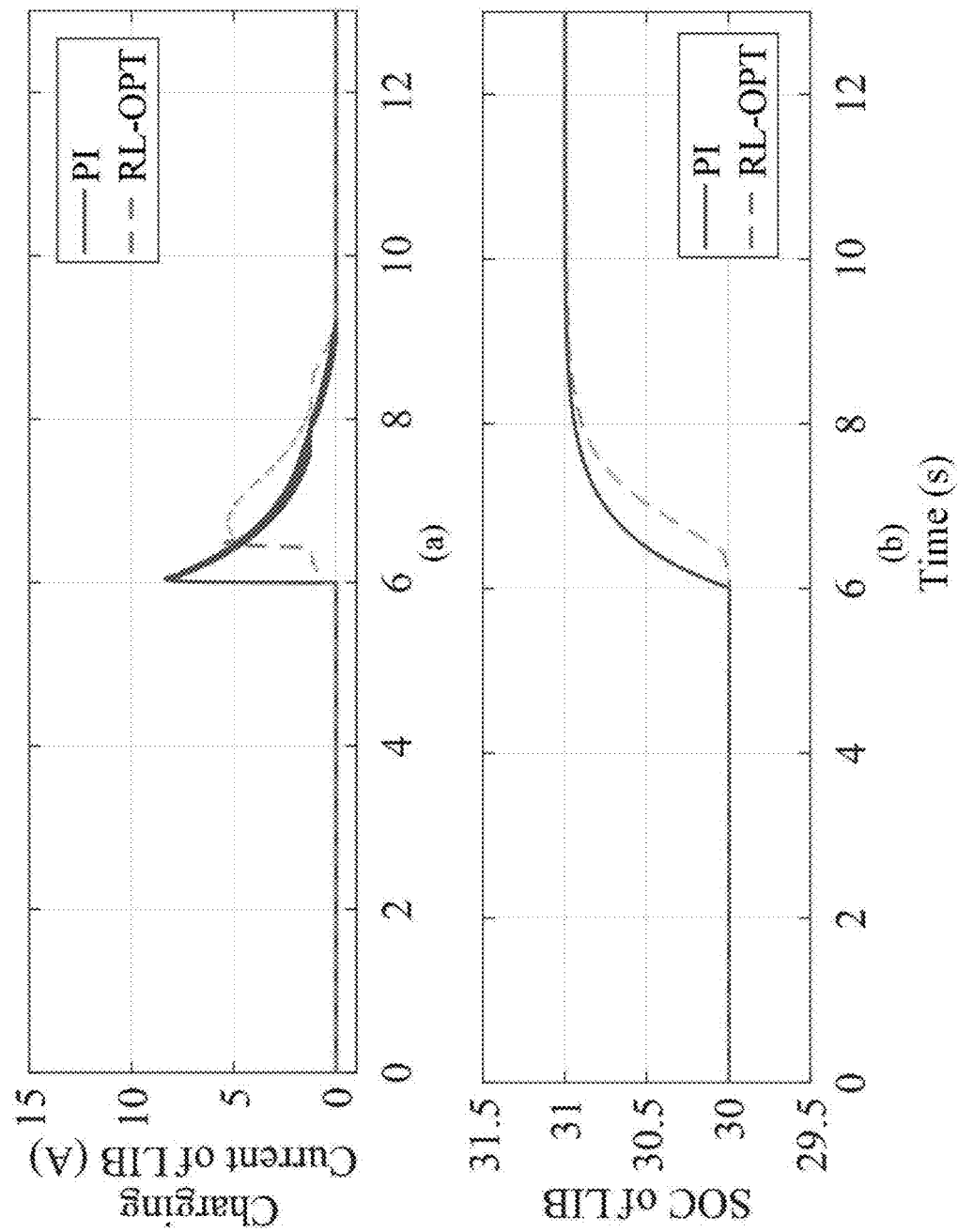
FIG. 9 shows a charging response of LIB in grid-tied mode.
Figure 10:
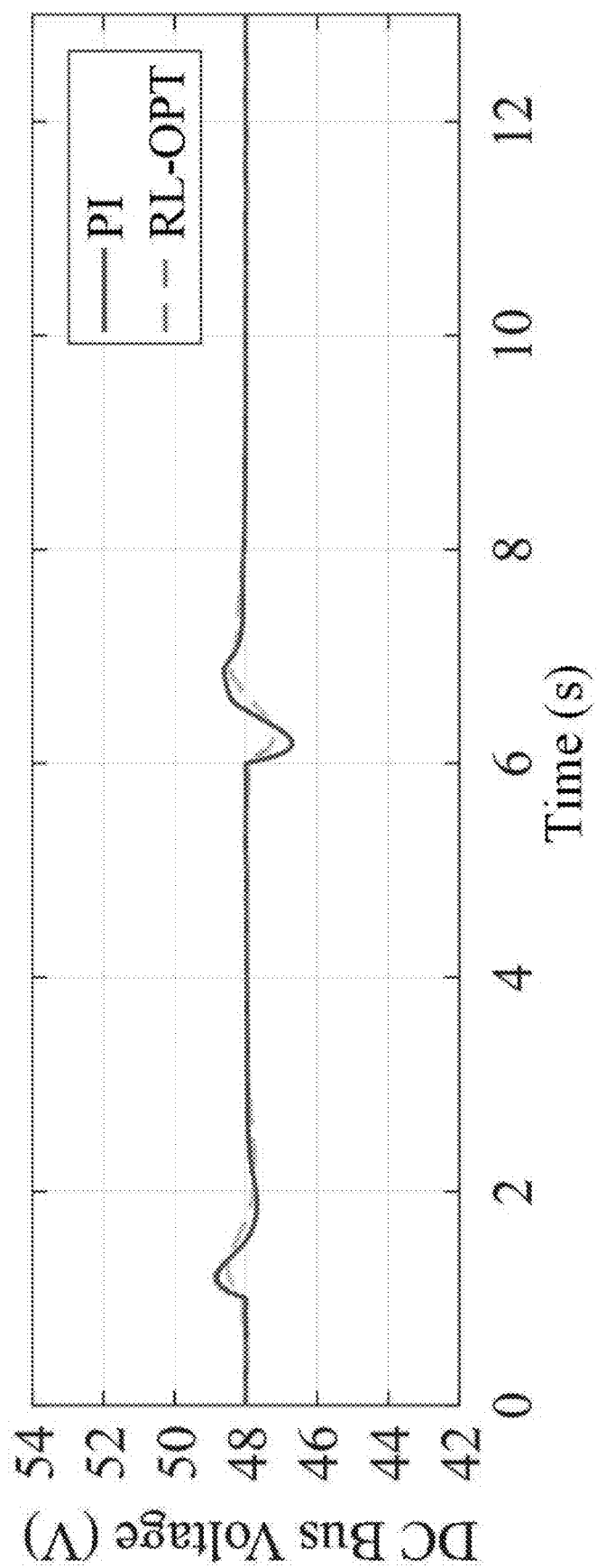
FIG. 10 shows a DC bus Voltage response in grid-tied mode.
Figure 11:
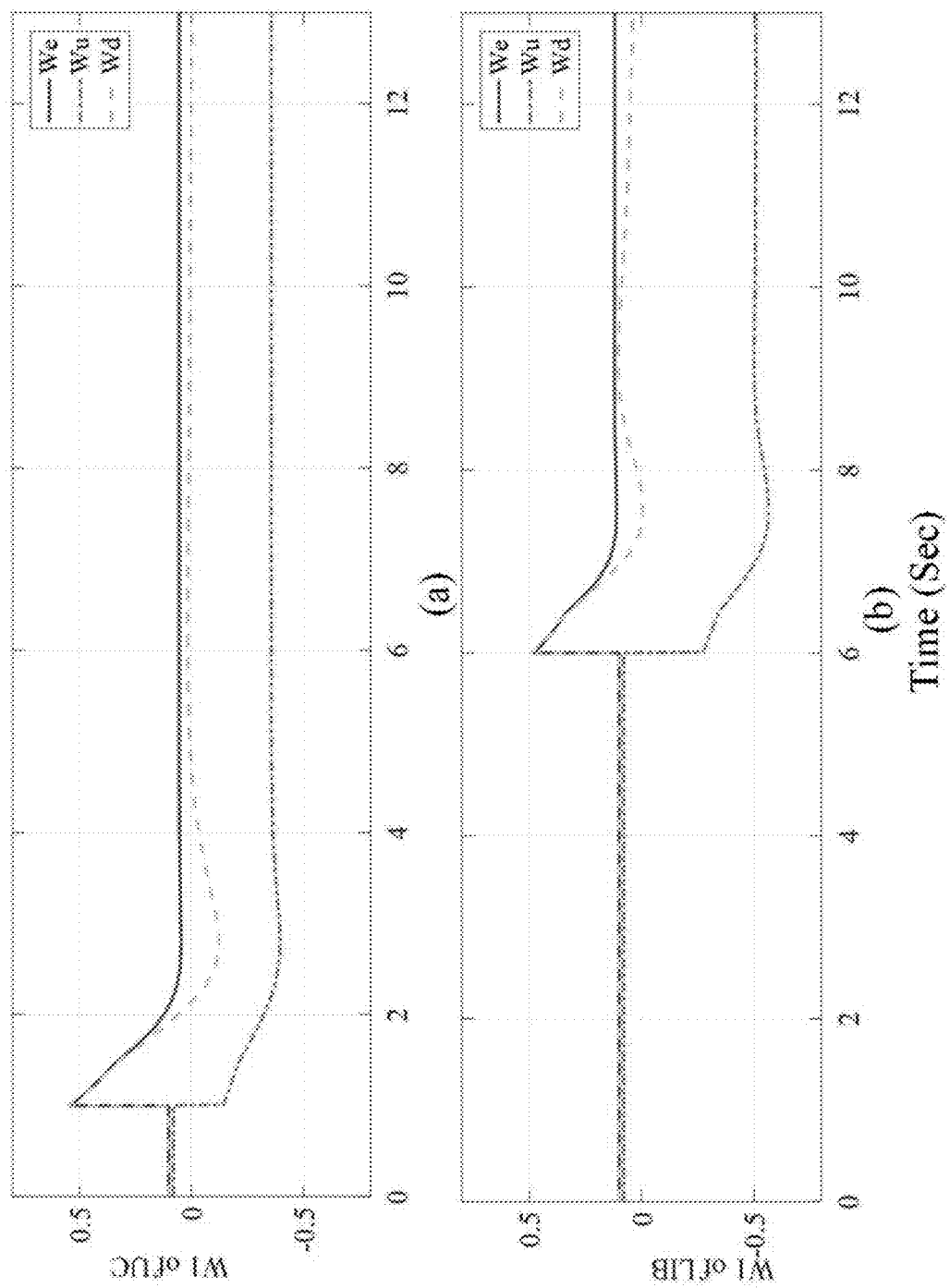
FIG. 11 shows activation weights of NN in grid-tied mode.

In case study II, the RL-NN controller is tested under the grid-tied microgrid. The simulation settings are same as that of the case I, except that the DC bus voltage is maintained by the external grid through a VSC. Similarly, the C&D current and SOC of UC and LIB are presented in FIG. 8 and FIG. 9, respectively. The responses of DC bus voltage is shown in FIG. 10. The responses of activation weights $W_1$ is shown in FIG. 11, among which FIG. 11(a) is the weight of UC controller and FIG. 11(b) is the weight of LIB controller, respectively. As the weights converge to their desired targets, the optimal control is achieved. As can be seen, the C&D profile as well as the activation weights of UC and LIB in grid-tied mode are almost the same as in islanded mode. However, the disturbances on DC bus voltage is significantly reduced because the main grid can provide a relatively stable voltage support compared to DG. Since the controller has already achieved the optimal control in the islanded mode, not much improvement can be observed in the grid-tied mode. Nevertheless, the performance of RL-NN controller is still better than the conventional PI-based controller in terms of C&D currents and unexpected disturbances. In addition, a detailed comparison between conventional control method and method is given in Table III.

TABLE III

| SIMULATION RESULTS COMPARISON | | | | |
|---|---|---|---|---|
| | Islanded-mode | | Grid-tied mode | |
| | $V_{surge}$ | $I_{surge}$ | $V_{surge}$ | $I_{surge}$ |
| Proposed RL method | 0.85 V (1.78%) | 4.74 A | 0.82 V (1.70%) | 4.74 A |
| Conventional method | 5.16 V (10.7%)) | 20.05 A | 1.35 V (2.81%) | 20.05 A |

Figure 12:
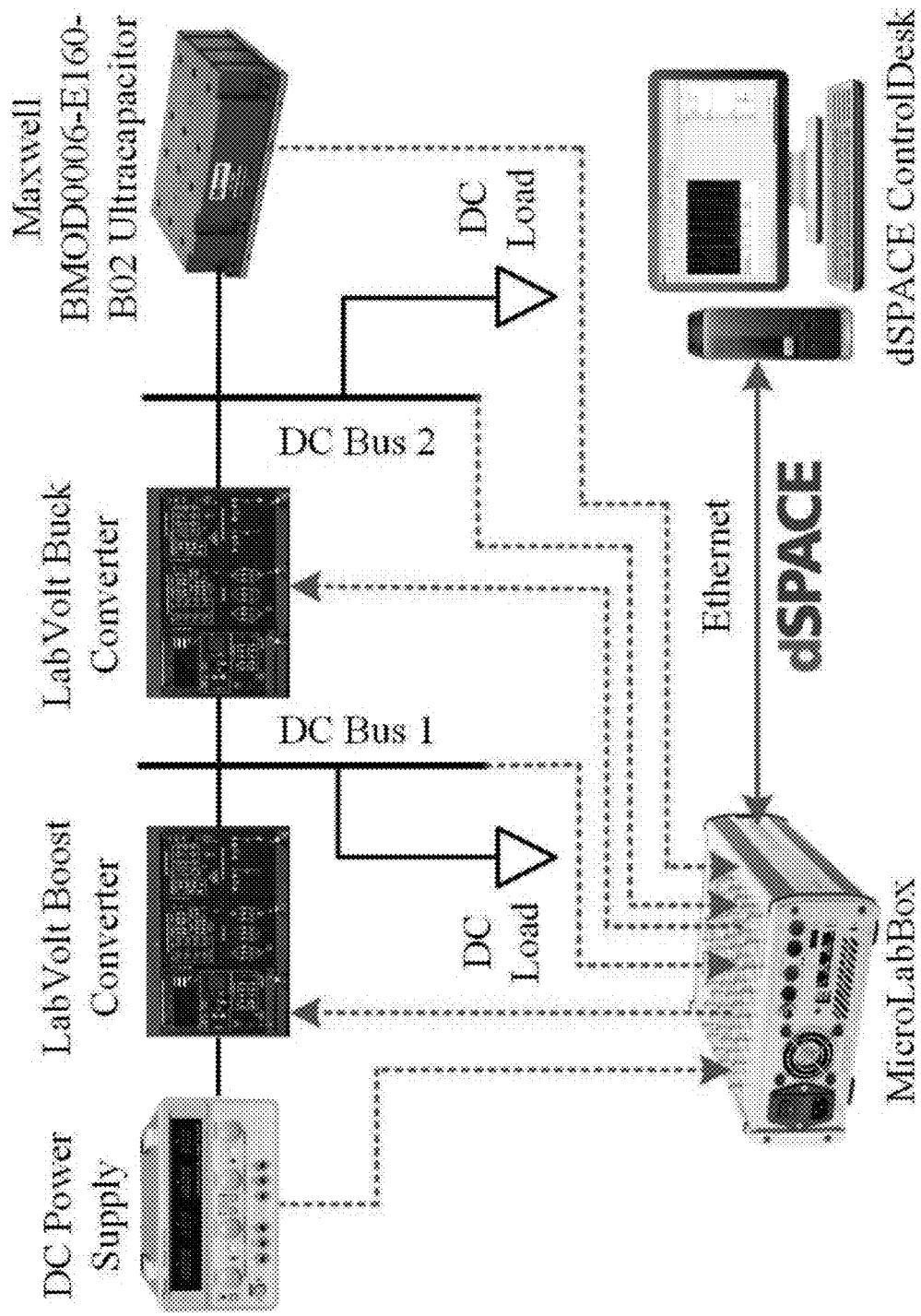
FIG. 12 shows a topology configuration of tested system.
Figure 13:
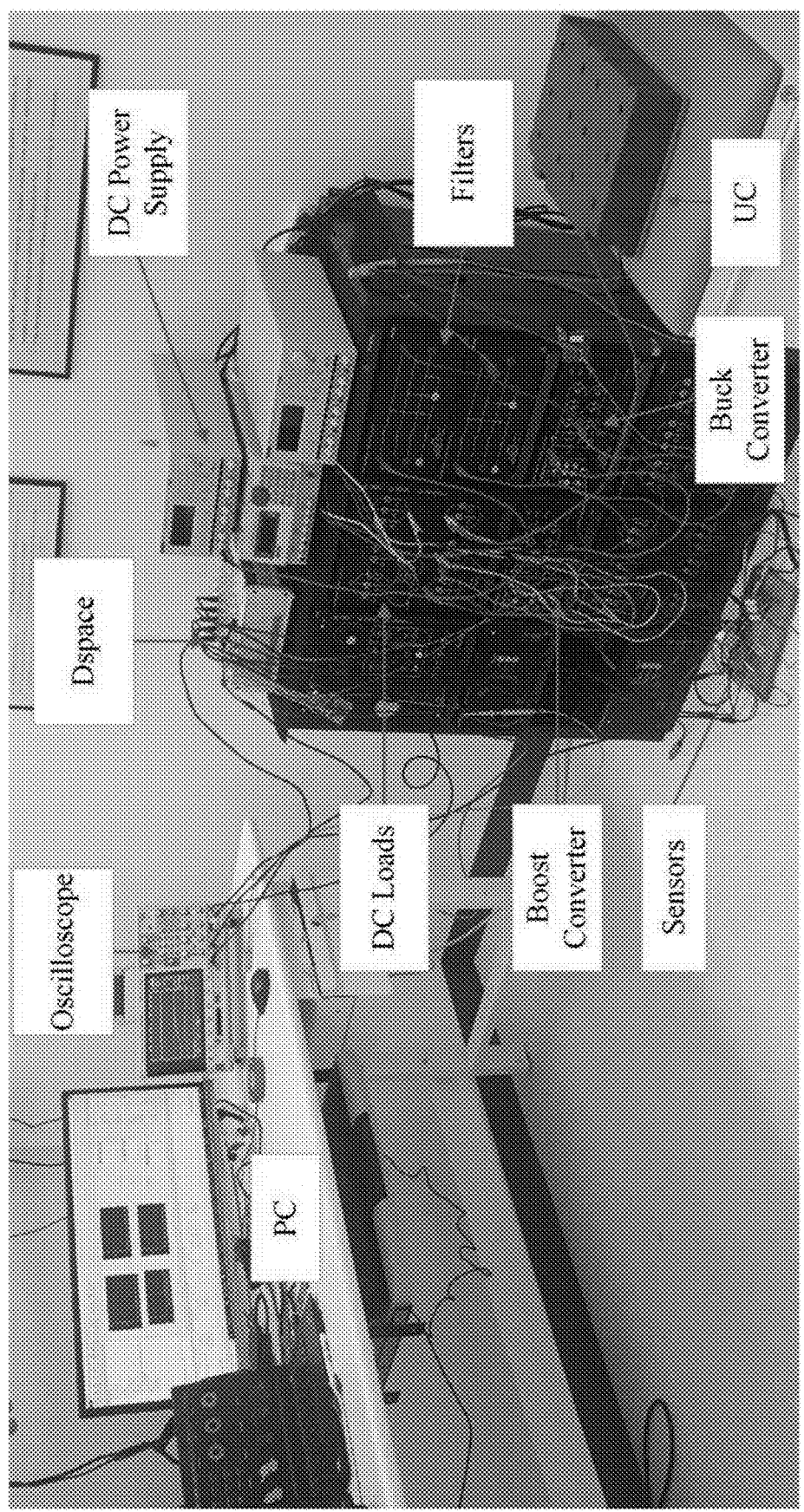
FIG. 13 shows a laboratory setup of the HIL testbed.

In case study III, the developed RL-OPT controller is fully evaluated through HIL experiments. The hardware experiment is very different from the software simulation since many practical problems may appear, e.g., communication delay and measurement noises. Therefore, it is meaningful to prove the effectiveness of the developed controller in a physical system and promote its corresponding application maturity. The topology configuration of tested system is shown in FIG. 12 and the laboratory setup of HIL testbed is presented in FIG. 13, respectively. The main system parameters are provided in Table IV. It should be mentioned that in software simulation and HIL experiments, the different components parameters and the same control parameters are used to demonstrate the adaptivity of the RL control method. Basically, a DC power supply connected with a boost converter is applied to maintain the DC bus voltage at 20V and supply the power for normal loads. A Maxwell UC (BMOD0006-E160-B02) is connected at the DC bus via a DC/DC buck converter. HIL platform dSPACE MicroLab-Box (DS1202) is employed to interface the microgrid and the RL-OPT controller that is implemented in the host PC. Variables are measured by the ADC I/Os and resulted switching signals sent by DAC I/Os of the DS1202 in a real-time manner. For safety consideration, the experiment is designed to charge the UC from 9V to 11V. It is noteworthy that, except for certain necessary system settings, the controller parameters are set exactly the same as they were in the simulation case studies without further tuning effort, as this can help to evaluate the scalability of controller.

TABLE IV

SYSTEM PARAMETERS OF HIL CASE STUDIES

| Parameter | Value | Parameter | Value |
|---|---|---|---|
| $C_{uc}$ | 6.0 F | $L_f$ | 2 mH |
| $C_f$ | 47 μF | $R_{load}$ | 20 Ω |

Figure 14:
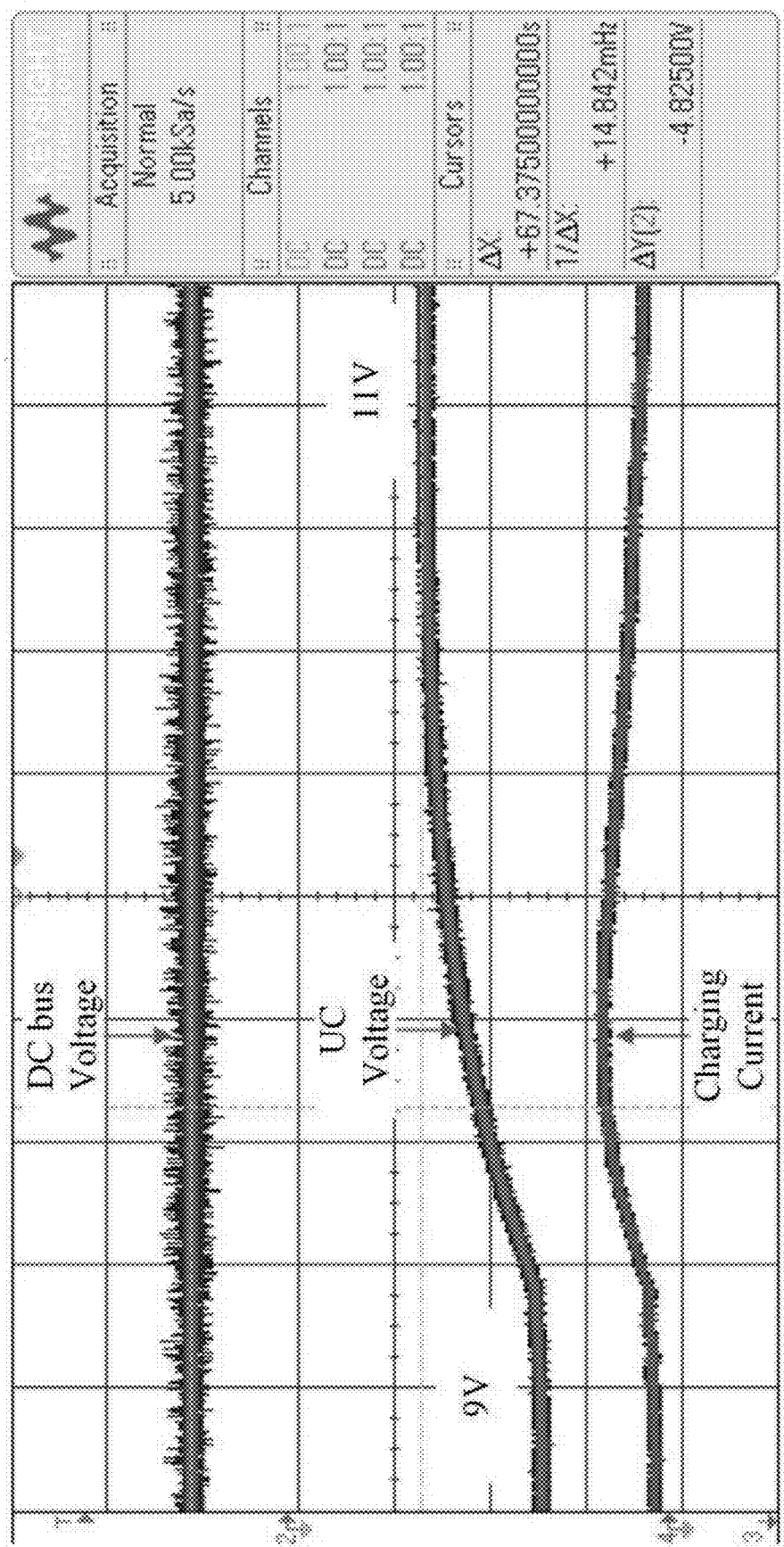
FIG. 14 shows HIL experiment results: DC bus voltage, UC voltage, and UC charging current.

The experiment results are presented in FIG. 14, where the green line denotes the DC bus voltage, blue line describes the voltage of UC, and red line describes the charging current. It can be observed from FIG. 14 that the entire charging process is smooth. Expect for the normal harmonics introduced by the switching devices and surrounding electromagnetic interference, the charging process of UC barely produces any disturbance to the common bus voltage. In addition, the system mismatch between software simulation and hardware experiment has been well resolved by the RL-based method, which is a significant merit of the method.

The instant reinforcement-learning-based online optimal (RL-OPT) control method is for hybrid energy storage system (HESS) in AC/DC microgrids involving photovoltaic (PV) systems and diesel generators (DG). Due to the low system inertia, conventional unregulated charging and discharging (C&D) of energy storages in microgrids may introduce disturbances that degrade the power quality and system performance, especially in fast C&D situations. Secondary and tertiary control levels can optimize the state of charge (SOC) reference of HESS; however, they are lacking the direct controllability of regulating the transient performance. Additionally, the uncertainties in practical systems greatly limit the performance of conventional model-based controllers. In this study, the optimal control theory is applied to optimize the C&D profile and to suppress the disturbances caused by integrating HESS. Neural networks (NN) are devised to estimate the nonlinear dynamics of HESS based on the input/output measurements, and to learn the optimal control input for bidirectional-converter-interfaced HESS using the estimated system dynamics. Because the RL-OPT method is fully decentralized, which only requires the local measurements, the plug & play capability of HESS can be easily realized. Both islanded and grid-tied modes are considered.

In sum, the RL-OPT controller is developed to provide a smooth C&D control for HESS in microgrids with unknown system parameters. First, a unified design approach for optimal control of uncertain nonlinear system is formulated. Then, one NN is designed to learn the system dynamics based on the input/output data. Next, another NN is developed to learn the optimal control input for system through online RL. The effectiveness of method is fully evaluated through extensive software simulations and HIL experiments.

Although solar energy is discussed in relation to the above implementations, the system, methods and all other implementations discussed above can also be used and applied in relation to other types of generators and for other forms of energy, such as energy harvested in wind generators and water pumps.

The operation and control features can be implemented in hardware, software or a combination of hardware and software. In the case of software, the software may be embodied in storage media or as firmware. Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

While particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method to manage a microgrid with a hybrid energy storage system (HESS), comprising:
   deriving a dynamic model of a bidirectional-power-converter (BPC)-interfaced HESS;
   applying a first neural network (NN) to estimate system dynamics of a nonlinear HESS model with AC and DC buses interconnected through a bidirectional DC/AC voltage source converter (VSC) and a PV array, and ultra-capacitor (UC) and lithium-ion batteries (LIB) connected on the DC bus, wherein the first NN approximates HESS model parameters using a perturbation term associated with the system dynamics and minimizes NN reconstruction errors for the nonlinear HESS model; and
   applying a second NN to calculate an optimal control input for the HESS through online learning based on the estimated system dynamics.

2. The method of claim 1, comprising testing the hybrid HESS with a non-linear system.

3. The method of claim 2, by defining the tracking error as $e(t)=U_c(t)-U_c^*$ with $U_c^*$ being a constant reference, comprising determining $$\dot{e}(t) = f(e(t)) + g(t)u(t) + D(t)$$
$$= W_e^{*T}\sigma_1(e) + W_u^{*T}\sigma_1(u) + W_d^{*T}1 + \dot{o}_1$$
$$= W_1^{*T}\sigma_1(e, u) + \dot{o}_1$$

where $\dot{e}(t)=\dot{U}_c(t)-\dot{U}_c^*=\dot{U}_c(t)-0=\dot{U}_c(t)$; $f(e)=(R_{sc}/L_f-1/C_u-cR_{pc})U_c$ and $g(t)=R_{sc}V_t/L_f$ are unknown nonlinear system dynamics; $u(t)=\alpha$ is the control input; $D(t)=[(R_{pc}+R_{sc})/C_{uc}R_p-R_{sc}R_f/L_f]I_c$ is a perturbation term of a system with $D(0)=0$ and is bounded as $\|D(t)\|\leq d_{max}$;

$$\alpha = \frac{1}{1-D},$$

$\forall S_1$ is off and $$\alpha = \frac{1}{D},$$

$\forall S_2$ is off; D is a duty ratio of PWM; $R_1$, $L_f$ and $C_f$ are filter resistance, inductance and capacitance, respectively; $R_{pc}$ and $R_{sc}$ are internal parallel and series resistance of ultra-capacitor (UC), respectively, $R_{pb}$ and $R_{sb}$ are the internal parallel and series resistance of lithium-ion batteries (LIB), respectively; $V_c$ and $U_c$ are internal and external voltages of energy storage unit (ESU), respectively; $V_t$ is terminal bus voltage; $W_1^*=[W_e^* \ W_u^* \ W_d^*]^T \in \mathfrak{R}^{N\times 1}$ are ideal unknown weights of NN identifier approximating system dynamics f(e), g(t) and D; $\sigma_1(e,u)=[\sigma_1(e) \ \sigma_1(u) \ 1] \in \mathfrak{R}^{N\times 1}$ is activation function where 1 represents a vector of ones, N is the number of hidden-layer neurons, $\mathring{\sigma}_1$ is NN reconstruction error, $W_1^*$ and $\mathring{\sigma}_1$ are bounded as $\|W_1^*\| \le W_{1M}$ and $\|\mathring{\sigma}_1\| \le \mathring{\sigma}_{1M}$, respectively, and D is a perturbation term associated with system dynamics and satisfies conditions to be estimated by the first NN.

4. The method of claim 2, comprising tracking error dynamics estimation as $\dot{\tilde{e}}(t) = \hat{W}_1^T \sigma_1(e,u) + k_1 \tilde{e}(t)$ where $\hat{W}_1 = [\hat{W}_e \ \hat{W}_u \ \hat{W}_d]^T \in \mathfrak{R}^{N \times 1}$ are the estimated NN identifier weights and $k_1$ is the selected parameter, where $[\hat{W}_e \ \hat{W}_u \ \hat{W}_d]$ is used to estimate weights $[\hat{W}_e \ \hat{W}_u \ \hat{W}_d]$ of NN identifier approximating system dynamics; $\sigma_1(e,u)$ is an activation function of tracking error e and control action u, N is the number of hidden-layer neurons.

5. The method of claim 2, comprising defining $\tilde{e}(t) = e(t) - \hat{e}(t)$ as an estimation error of tracking error, and determining dynamics of $\tilde{e}(t)$ as $$\dot{\tilde{e}}(t) = \dot{e}(t) - \dot{\hat{e}}(t)$$
$$= W_1^{*T} \sigma_1(e,u) + \dot{q} - \hat{W}_1^T \sigma_1(e,u) - k_1 \tilde{e}(t)$$
$$= \tilde{W}_1^T \sigma_1(e,u) + \dot{q} - k_1 \tilde{e}(t)$$

where the NN weight estimation error is defined as $\tilde{W}_1(t) = W_1^* - \hat{W}_1(t)$, and $\dot{\tilde{W}}_1(t) = -\dot{\hat{W}}$; $k_1$ is selected parameter to maintain NN identifier stability; $\sigma_1(e,u)$ is activation function of tracking error e and control action u, N is number of hidden-layer neurons, $\mathring{\sigma}_1$ is NN reconstruction error, $W_1^*$ and $\mathring{\sigma}_1$ are bounded as $\|W_1^*\| \le W_{1M}$ and $\|\mathring{\sigma}_1\| \le \mathring{\sigma}_{1M}$, respectively.

6. The method of claim 2, comprising forcing estimated NN identifier weight $\hat{W}_1(t)$ to converge to a target weight $W_1^*$ by updating $\hat{W}_1$ as $\dot{\hat{W}}_1 = -k_2 \hat{W}_1^T \sigma_1(e,u) + \sigma_2(e,u) e(t)$, where $k_2$ is a positive tuning parameter of NN identifier, $\sigma_1(e,u)$ is activation function of tracking error e and control action u, N is number of hidden-layer neurons, $\mathring{\sigma}_1$ is NN reconstruction error, $W_1^*$ and $\mathring{\sigma}_1$ are bounded as $\|W_1^*\| \le W_{1M}$ and $\|\mathring{\sigma}_1\| \le \mathring{\sigma}_{1M}$, respectively.

7. The method of claim 1, comprising determining an approximated Hamiltonian of optimal control problem as:

$$\hat{H}(e, \hat{u}, \hat{V}) = Q(e) + \frac{1}{4} \hat{W}_2^{T''} \sigma_2 \hat{W}_u R^{-1} \hat{W}_u^{T''} \sigma_2^T \hat{W}_2 +''$$
$$\sigma_2^T \hat{W}_2 [\hat{W}_1^T(t) \sigma_1(e,u) + k_1 \tilde{e}(t)] + \frac{1}{4} \hat{W}_2^{T''} \sigma_2'' \sigma_2^T \hat{W}_2 + d_{max}^2$$

where $Q(e) = e^T P e$ is a positive definite function of e with P being a symmetric positive definite matrix; $\hat{W}_u^T$ is estimated weight of dynamic; $\hat{W}_2^T \in \mathfrak{R}^{1 \times N}$ are estimated weights of a cost function estimator; $\sigma_1$ and $\sigma_2$ are activation functions of tracking error e and control action u; $k_1$ is selected parameter to maintain NN identifier stability; $d_{max}$ is constant bound of disturbance; $\hat{u}$ is estimation of optimal control action and $\hat{V}(e)$ is estimation of cost function; $\tilde{e}(t)$ is estimation error of tracking error.

8. The method of claim 1, comprising tuning a NN weight of cost function estimator as $$\dot{\hat{W}}_2 = \frac{k_3}{2} \Theta(e, \hat{u})'' \nabla \sigma_2 \hat{W}_u R^{-1} \hat{W}_u^T J_{1\partial e}^T - \frac{k_4 \omega \hat{H}}{(1 + \omega^T \omega)^2}$$

where $k_3$ and $k_4$ are designed control coefficients, $\omega = -["\sigma_2 \hat{W}_u R^{-1} \hat{W}_u^{T"} \sigma_2^T W_2]/2$, and $\Theta(e,\hat{u})$ is an index operator given by $$\Theta(e, \hat{u}) = \begin{cases} 0, & \forall \dot{J}_1 = J_{1\partial e}^T \dot{e} < 0 \\ 1, & \text{otherwise} \end{cases}$$

where $J_1$ is an unbounded Lyapunov candidate and $J_{1\partial e}$ is its partial derivative with respect to error e; $\hat{W}_u^T$ is estimated weight of dynamic; $\hat{W}_2^T \in \mathfrak{R}^{1 \times N}$ are estimated weights of a cost function estimator; $\sigma_2$ is an activation function of tracking error e and control action u; $\hat{u}$ is estimation of optimal control action; and R is a symmetric positive definite matrix.

9. The method of claim 8, wherein $J_{1\partial e}$ comprises $$\|\dot{e}\| \le c_1 \|e\| = (c_2 \|J_{1\partial e}\|)^{1/4}$$

where $c_1$ and $c_2$ are constants and $J_{1\partial e}$ is its partial derivative with respect to error e.

10. The method of claim 8, where $\|J_{1\partial e}\|$ satisfies a general bound where $$J_1 = \frac{1}{5}(e^T e)^{\frac{5}{2}}.$$

where $J_1$ is an unbounded Lyapunov candidate and $J_{1\partial e}$ is its partial derivative with respect to error e.

11. The method of claim 1, comprising analyzing both grid-tied and islanded modes of the microgrids using measurement-based neural networks.

12. The method of claim 1, wherein in a grid-tied mode, the main grid is considered as an infinite source which maintains bus voltage and reactive power at a point of common coupling (PCC) through a voltage source converter (VSC).

13. The method of claim 1, wherein while in islanded mode, diesel generators (DGs) are deployed to maintain the bus voltage at common coupling (PCC).

14. The method of claim 1, comprising controlling a photovoltaic (PV) array under a maximum power point tracking (MPPT) mode to maximize a renewable distribution energy resource (DER) utilization.

15. The method of claim 1, comprising formulating an optimal control problem of hybrid energy storage system (HESS) using a reinforcement learning (RL) method to reduce the disturbances caused by charging & discharging (C&D) of one or more energy storage devices.

16. The method of claim 1, comprising adapting different system dynamics based on input/output data.

17. The method of claim 1, wherein the microgrid consists of AC and DC buses interconnected through a bidirectional DC/AC voltage source converter (VSC) and a PV array operates in maximum power point tracking (MPPT) mode, and the hybrid energy storage system (HESS) with both ultra-capacitor (UC) and lithium-ion batteries (LIB) are connected on a DC bus, and grid-tied and islanded operation mode switching of the microgrid is realized by operating the circuit breaker (CB).

18. A method to manage a microgrid with a hybrid energy storage system (HESS), comprising:
deriving a dynamic model of a bidirectional-power-converter (BPC)-interfaced HESS;
applying a first neural network (NN) to estimate a system dynamics; and applying a second NN to calculate an optimal control input for the HESS through online learning based on the estimated system dynamics; and representing a cost function V*(e) by a single-layer NN on set Ω as $V^*(e) = W_2^{*T}\sigma_2(e,u) + \tilde{\sigma}_2$ where $W_2^{*T} \in \Re^{1 \times N}$ are ideal unknown weights of a cost function estimator, $\sigma_2(e,u)$ is an activation function of tracking error e and control action u, $\tilde{\sigma}_2$ is an NN reconstruction error, $W_2^*$ and $\tilde{\sigma}_2$ are bounded as $\|W_2^*\| \leq W_{2M}$ and $\|\tilde{\sigma}_2\| \leq \tilde{\sigma}_{2M}$ with $W_{2M}$ and $\tilde{\sigma}_{2M}$ as two constant bounds, respectively.

19. The method of claim 18, comprising applying the cost function estimator as $\hat{V}(e) = \hat{W}_2^T \sigma_2(e,u)$, where $\hat{V}(e)$ is estimation of cost function $V^*(e)$, $\hat{W}_2^T \in \Re^{1 \times N}$ are estimated weights of a cost function estimator and $\sigma_2(e,u)$ is an activation function of tracking error e and control action u.

20. A method to manage a microgrid with a hybrid energy storage system (HESS), comprising:

deriving a dynamic model of a bidirectional-power-converter (BPC)-interfaced HESS;

applying a first neural network (NN) to estimate a system dynamics; and applying a second NN to calculate an optimal control input for the HESS through online learning based on the estimated system dynamics; and deriving an estimated optimal control policy based on the two NNs as $$\hat{u} = -\frac{1}{2}R^{-1}\hat{W}_u^{T''}\sigma_2(e,u)^T \hat{W}_2$$

where "$\sigma_2'(e,u) = \partial \sigma_2(e,u)/\partial e$ is a partial derivative of $\sigma_2(e,u)$ with respect to tracking error e; R is a symmetric positive definite matrix; $\hat{W}_u^T$ is estimated weight of dynamic; $\hat{W}_2^T \in \Re^{1 \times N}$ are estimated weights of a cost function estimator and $\sigma_2(e,u)$ is an activation function of tracking error e and control action u.

* * * * *